United States Patent [19]

Nagaoka et al.

[11] Patent Number: 5,336,713
[45] Date of Patent: Aug. 9, 1994

[54] RESIN COMPOSITION

[75] Inventors: Kenji Nagaoka, Ichihara; Satoru Gotoh, Sodegaura, both of Japan

[73] Assignee: Sumitomo Chemical Company, Limited, Osaka, Japan

[21] Appl. No.: 55,305

[22] Filed: May 3, 1993

[30] Foreign Application Priority Data

May 22, 1992 [JP] Japan .................................. 4-130596

[51] Int. Cl.$^5$ ............................................ C08L 71/12
[52] U.S. Cl. ...................................... 524/540; 524/494; 525/391; 525/392; 525/395
[58] Field of Search ............... 524/494, 540; 525/391, 525/392, 395

[56] References Cited

U.S. PATENT DOCUMENTS

| 4,738,991 | 4/1988 | Narayan | 528/48 |
| 5,026,764 | 5/1991 | Okabe et al. | 524/540 |
| 5,026,764 | 6/1991 | Okabe et al. | . |
| 5,028,656 | 7/1991 | Okabe et al. | . |

FOREIGN PATENT DOCUMENTS

| 0341422 | 11/1989 | European Pat. Off. . |
| 0368413 | 5/1990 | European Pat. Off. . |
| 3939761 | 1/1991 | Fed. Rep. of Germany . |
| 2218996 | 11/1989 | United Kingdom . |

OTHER PUBLICATIONS

Database WPIL, Week 9237, Nov. 11, 1992, Derwent Publications Ltd., London GB; AN 92-305496 & JP-A-4 213 357 (Asahi Chem) Aug. 4, 1992.
Database WPIL, Week 9216, Jun. 17, 1992, Derwent Publications Ltd., London, GB; AN 92-126216 & JP-A-4 059 871 (Toray Ind) Feb. 26, 1992.

*Primary Examiner*—Paul R. Michl
*Assistant Examiner*—Edward J. Cain
*Attorney, Agent, or Firm*—Stevens, Davis, Miller & Mosher

[57] ABSTRACT

A resin composition having an excellent welding property comprising a polyphenylene ether and a polyarylene sulfide is provided. The resin composition comprises (A) a polyphenylene ether and (B) a polyarylene sulfide having a temperature-mediated crystallization (Tmc) of not greater than 225° C.

9 Claims, No Drawings

RESIN COMPOSITION

FIELD OF THE INVENTION

The present invention relates to a resin composition and more particularly, to a thermoplastic resin composition having an excellent welding property in injection or extrusion moldings, etc., which comprises a polyphenylene ether and a polyarylene sulfide as main resin components.

BACKGROUND OF THE INVENTION

Polyphenylene ethers are resins having excellent mechanical and electrical properties and high heat resistance but have the defect of poor moldability and poor solvent resistance. It is therefore under the situation that for utilization of polyphenylene ethers alone, its range is greatly restricted.

On the other hand, polyarylene sulfides represented by polyphenylene sulfide are one of resins classified into heat resistant resins and are known to have, in addition to high temperature tolerability for continuous use and high rigidity, the properties that they have high melt rheology, fire retardant properties and excellent solvent resistance. Polyarylene sulfides have thus been widely used as various molded products or films for practical purpose. However, these polyarylene sulfides are poor in mechanical strength, especially in impact strength. Such a defect is a serious obstacle to broadening the utility to a broader range.

Under the situations, it is a valuable attempt, from an industrial viewpoint, to develop resin compositions with benefit of the properties of each component by blending polyphenylene ethers and polyarylene sulfides each having excellent properties. Indeed, such proposal has already been made (Japanese Patent KOKOKU No. 56-34032). In general, however, since the compatibility between polyphenylene ethers and polyarylene sulfides is low, it is practically difficult to obtain resin compositions having excellent mechanical properties by simply blending the two polymers.

To improve the foregoing problems, there have been proposed the following resin compositions: a resin composition comprising modified polyphenylene ether and polyarylene sulfide (Japanese Patent KOKAI No. 64-36645), a resin composition comprising modified polyphenylene ether, modified polyarylene sulfide and a binder (Japanese Patent KOKAI No. 1-266160), a resin composition comprising modified polyphenylene ether modified by an unsaturated carboxylic acid or an unsaturated carboxylic acid anhydride, polyphenylene sulfide and a polyisocyanate compound, or a resin composition comprising polyphenylene ether, polyphenylene sulfide, a modifying agent which is an unsaturated carboxylic acid or an unsaturated carboxylic acid anhydride, and a polyisocyanate compound (Japanese Patent KOKAI No. 2-49023), a resin composition comprising a modified polyphenylene ether modified with an organic compound containing an ethylenic double bond and a carboxyl group or an acid anhydride group, and a polyphenylene sulfide in which free SH terminal group is present in a concentration of $10 \times 10^{-6}$ gram equivalents/g or more (Japanese Patent KOKAI No. 3-17153), etc. However, these compositions proposed before are not satisfactory in terms of welding properties in injection- or extrusion-molded products, namely, in terms of the properties of providing molded articles having a minimized rate in decrease of the strength of welded portion to that of non-welded portion, while general mechanical properties or solvent resistance is improved. In addition, either polyphenylene ether or polyarylene sulfide or both should be modified with a carboxylic acid, etc. so that economical disadvantage is involved. Therefore, these compositions are not necessarily satisfactory from an industrial viewpoint.

As compositions which are excellent from an economical standpoint, there are proposed a resin composition comprising a polyphenylene ether, a polyphenylene sulfide and an epoxy resin (Japanese Patent KOKOKU No. 60-11063), a resin composition comprising a polyphenylene ether, a crystalline thermoplastic resin and a compatibilizing agent (Japanese Patent KOKAI No. 63-183954), a polymer blend comprising a polyphenylene ether, a polyarylene sulfide and a compatibilizing agent used for a polyphenylene ether-polyamide polymer mixture (Japanese Patent KOKAI No. 2-36361), a resin composition comprising a polyphenylene sulfide, a polyphenylene ether and a compound containing a specific moiety structure (EP 0368413A2), etc. However, these compositions are not satisfactory in welding properties, either. Furthermore, a resin composition comprising a polyphenylene ether, a polyphenylene sulfide and a polyisocyanate compound is also disclosed in Japanese Patent KOKAI No. 2-49023. However, it is described that the composition has a poor degree of compatibility and, this composition is not excellent in welding properties.

SUMMARY OF THE INVENTION

An object of the present invention is to provide a resin composition having excellent economical and mechanical properties, especially having excellent welding properties in injection- or extrusion-molded products which comprises as the main components a polyphenylene ether characterized by its heat resistance and mechanical properties and a polyarylene sulfide characterized by its solvent resistance, fire retardant properties, melt rheology, etc.

Under the situations, the present inventors have made extensive studies on resin compositions of polyphenylene ethers, polyarylene sulfides and polyisocyanates having excellent properties as described above to achieve the foregoing object. As a result, it has been found that where a polyarylene sulfide having a specific crystalline property is used as the polyarylene sulfide component, a resin composition having particularly excellent welding properties can be obtained. The present invention has thus come to be accomplished.

That is, the present invention relates to a resin composition comprising:

(A) a polyphenylene ether and, (B) a polyarylene sulfide having a temperature-mediated crystallization (Tmc) of not greater than 225° C.

The present invention also relates to a resin composition further containing (C) a compatibilizing agent and/or (D) a filler in addition to the components (A) and (B) described above.

DETAILED DESCRIPTION OF THE INVENTION

The polyphenylene ether (A) in the present invention is a polymer comprising a recurring unit shown by general formula 1:

General formula 1

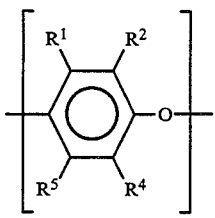

wherein $R^1$, $R^2$ $R^3$ and $R^4$, which may be the same or different, each represents a member selected from the group consisting of hydrogen atom, a halogen atom, a hydrocarbon group, a substituted hydrocarbon group, a hydrocarbon oxy group and a substituted hydrocarbon oxy group.

Examples of the substituent in the substituted hydrocarbon group and substituted hydrocarbon oxy group include a halogen atom, a hydroxy group, an amino group, a nitro group, a cyano group, a carboxyl group, an amido group, an ether group, a sulfide group, a sulfone group, etc., which are thermally stable.

Specific examples of the polyphenylene ether containing the repeating unit shown by general formula 1 include
poly(2,6-dimethyl-1,4-phenylene ether),
poly(2,6-diethyl-1,4-phenylene ether),
poly(2-methyl-6-ethyl-1,4-phenylene ether),
poly(2-methyl-6-propyl-1,4-phenylene ether),
poly(2,6-dipropyl-1,4-phenylene ether),
poly(2-ethyl-6-propyl-1,4-phenylene ether),
poly(2,6-dibutyl-1,4-phenylene ether),
poly(2,6-dipropenyl-1,4-phenylene ether),
poly(2,6-dilauryl-1,4-phenylene ether),
poly(2,6-diphenyl-1,4-phenylene ether),
poly(2,6-dimethoxy-1,4-phenylene ether),
poly(2,6-diethoxy-1,4-phenylene ether),
poly(2-methoxy-6-ethoxy-1,4-phenylene ether),
poly(2-ethyl-6-stearyloxy-1,4-phenylene ether),
poly(2-methyl-6-phenyl-1,4-phenylene ether),
poly(2-methyl-1,4-phenylene ether),
poly(2-ethoxy-1,4-phenylene ether),
poly(2-chloro-1,4-phenylene ether),
poly(3-methyl-6-t-butyl-1,4-phenylene ether),
poly(2,6-dichloro-1,4-phenylene ether),
poly(2,5-dibromo-1,4-phenylene ether),
poly(2,6-dibenzyl-1,4-phenylene ether) and various copolymers containing a plurality of the recurring units constituting these polymers. The copolymers include copolymers of a multi-substituted phenol such as 2,3,6-trimethylphenol, 2,3,5,6-tetramethylphenol, etc. and 2,6-dimethylphenol, and the like.

The polyphenylene ethers (A) referred to in the present invention also cover modified polyphenylene ethers obtained by grafting the polyphenylene ethers described above with a styrene type monomer such as styrene, α-methylstyrene, etc.

Of these polyphenylene ethers, preferred are poly(2,6-dimethyl-1,4-phenylene ether) and a copolymer of 2,6-dimethylphenol and 2,3,6-trimethylphenol.

A preferred range of the molecular weight of the polyphenylene ether which can be used in the present invention varies depending upon purpose and is not generally determined. In general, however, the molecular weight is in the range of 0.1 to 0.7 dl/g, preferably in the range of 0.2 to 0.6 dl/g, when expressed by limiting viscosity measured in chloroform at 30° C.

Processes for preparing such polyphenylene ethers are known and described, for example, in U.S. Pat. Nos. 3,306,874, 3,306,875 and 3,257,357, Japanese Patent Publication KOKOKU No. 52-17880, Japanese Patent Publication KOKAI Nos. 50-51197 and 1-304119, etc.

The polyarylene sulfide (B) in the present invention refers to a polymer comprising the recurring unit shown by general formula 2 (wherein Ar represents a divalent aromatic residue) in which has a temperature-mediated crystallization (Tmc) of 225° C. or below. Herein the term "temperature-mediated crystallization" is used to mean a temperature for crystallization measured at a descending temperature after melting and a value obtained by measuring at a descending temperature of 10° C./min in DSC. A preferred polyphenylene sulfide is the polyphenylene sulfide having Tmc of 215° C. or below.

General formula 2

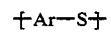

wherein Ar represents a divalent aromatic residue.

Examples of Ar include divalent aromatic residues shown by formulae 3 through 12 and nucleus-substituted residues thereof.

General formula 3

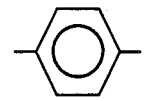

General formula 4

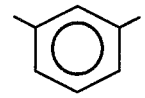

General formula 5

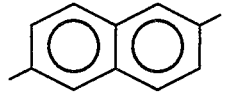

General formula 6

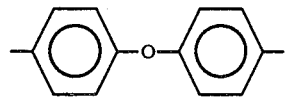

General formula 7

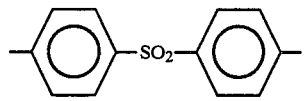

General formula 8

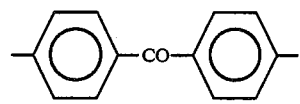

General formula 9

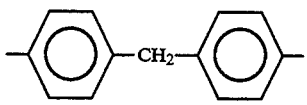

General formula 10

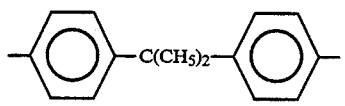

General formula 11

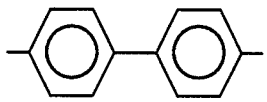

General formula 12

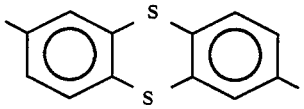

In addition to these divalent aromatic residues, polymers containing a small quantity of a trifunctional group shown by formula 13 are also included in the polyarylene sulfide of the present invention.

General formula 13

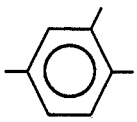

Specific examples of the polyarylene sulfide shown by general formula 2 include polyphenylene sulfide, poly(1,4-phenylenecarbonyl-1,4-phenylenesulfide), poly(1,4-phenylenesulfonyl-1,4-phenylenesulfide), poly(biphenylenesulfide), etc. Of these, preferred are polyarylene sulfides containing at least 50 mol% of the recurring unit shown by formula 14 and, polyphenylene sulfide is more preferred.

Formula 14

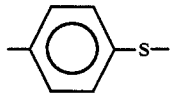

In general, the polyarylene sulfide described above is classified into two types of linear type and crosslinking type including partial crosslinking. In the present invention, both types are usable.

The molecular weight of the polyarylene sulfide (B) is not particularly limited. In general, there are used polyarylene sulfides having a melt viscosity of 50 to 50,000 poise, preferably 200 to 20,000 poise, more preferably 500 to 2,000 poise, when measured at a temperature of 316° C. and a shearing rate of 1000 sec$^{-1}$ with a flow tester, a capillary rheometer, etc.

These polyarylene sulfides (B) may be prepared, e.g., by a process which comprises reacting a polyhalogenated aromatic compound with a sulfur source such as an alkali sulfide, etc. in an organic polar solvent (U.S. Pat. Nos. 2,513,188 and 4,038,261, Japanese Patent Publication KOKOKU No. 44-27671), a process for preparing linear polyarylene sulfides which comprises adding a carboxylic acid salt to the reaction system (Japanese Patent Publication KOKOKU No. 52-12240, Japanese Patent Publicat. ion KOKAI Nos. 51-144497 and 58-29822, Japanese Patent Publication KOKOKU No. 53-25880, etc.) or the like.

In the resin composition of the present invention, a ratio of the polyphenylene ether (A) to the polyarylene sulfide (B) formulated can be freely chosen depending upon purpose like heat resistance, fluidity, etc. required for the composition but there is no particular restriction on the ratio. However, the weight ratio of the polyphenylene ether (A) to the polyarylene sulfide (B) is from 1:99 to 99:1, preferably 5:95 to 95:5, more preferably 8:92 to 65:35, % by weight, based on the total weight of the polyphenylene ether (A) and the polyarylene sulfide (B).

The compatibilizing agent (C) which may be used in the present invention refers to a substance which functions to enhance compatibility between the polyphenylene ether and the polyphenylene sulfide. Examples of the compatibilizing agent are epoxy compounds disclosed in Japanese Patent Publication KOKOKU No. 60-11063 supra, compatibilizing agents used for the blend of polyphenylene ether and crystalline thermoplastic resin such as polyamide, etc. disclosed in Japanese Patent KOKAI Nos. 63-183954 and 2-36261, and the like. These patent specifications are incorporated in the present specification by reference.

Among these compatibilizing agents, preferred are polyisocyanates.

The polyisocyanate (C) in the present invention refers to an organic compound containing two or more isocyanate groups and/or isothiocyanate groups in the molecule thereof. Specific examples of such polyisocyanates include aromatic polyisocyanates such as m-phenylene diisocyanate, 2,4-toluylene diisocyanate, 2,6-toluylene diisocyanate, 4,4'-diphenylmethane diisocyanate, 4,4'-diphenylpropane diisocyanate, naphthylene-1,5-diisocyanate, 3,3'-dimethylbiphenyl-4,4'-diisocyanate, dimethyldiphenylmethane diisocyanate, diphenyl ether-4,4'-diisocyanate, diphenylsulfone-4,4'-diisocyanate, triphenylmethane triisocyanate, etc.; aromatic-aliphatic polyisocyanates such as xylylene diisocyanate, etc.; aliphatic polyisocyanates such as 4,4'-cyclohexane diisocyanate, dicyclohexylmethane-4,4'-diisocyanate, isophorone diisocyanate, 1,12-dodecane diisocyanate, hexamethylene diisocyanate, 2,4,4-trimethylhexamethylene diisocyanate, etc., and mixtures thereof, as well as compounds having an isothiocyanate group corresponding thereto. The polyisocyanates of the present invention also include polymers of these compounds, e.g., dimers, trimers, etc.; carbodiimide-modified type; modified polyisocyanates such as block type obtained by masking the isocyanate group with phenols, lactams, etc.

Among the polyisocyanates described above, preferred polyisocyanates are aromatic polyisocyanates and aliphatic polyisocyanates, more preferably 2,4-toluylene diisocyanate, 2,6-toluylene diisocyanate, 4,4'-diphenylmethane diisocyanate, 3,3'-dimethylbiphenyl-4,4'-diisocyanate, diphenyl ether-4,4'-diisocyanate, hexamethylene diisocyanate and isophorone diisocyanate, etc., most preferably 4,4'-diphenylmethane diisocyanate and polymethylene polyphenylene polyisocyanate.

Where the compatibilizing agents (C) are used in the resin composition of the present invention, a preferred range of the proportion of the components used to exhibit the effect is not generally determined since the effect varies depending upon kind or composition of the polyphenylene ether (A) and the polyarylene sulfide (B) chosen, in addition to the kind of the component (C) itself. In general, however, the weight ratio of the polyisocyanate (C) is in the range of 0.01 to 30 parts by weight, preferably 0.1 to 20 parts by weight, more preferably 1 to 10 parts by weight, based on the total 100 parts by weight of the polyphenylene ether (A) and the polyarylene sulfide (B).

If necessary and desired, the resin composition of the present invention may contain fillers (D). Examples of such fillers are inorganic fibers such as glass fibers, potassium titanate fibers, rockwool, carbon fibers, etc.; organic fibers such as aromatic polyamide fibers, polybenzimidazole fibers, etc.; metal fibers such as stainless fibers, fibers of brass, zinc aluminum fibers, etc.; inorganic compound particles such as glass beads, asbestos, wollastonite, mica, talc, clay, calcium carbonate, magnesium hydroxide, silica, diatomaceous earth, etc.; metal particles such as aluminum flakes, zinc flakes, etc.; organic compound particles such as polyimide powders, etc. Of these fillers, preferred fillers are glass fibers.

For preparing the resin composition of the present invention, a variety of conventional processes such as solution blending, melt kneading, etc. are applicable but melt kneading is preferred. For melt kneading, the components described above are, for example, mixed with known mixing means used for mixing the resins with each other, the resin and liquid or solid additive, using a Henschel mixer, a super mixer, a ribbon blender, a V blender, etc. to form a homogeneous mixture; then, the mixture is kneaded by a kneading means using a Bambury mixer, a plast mill, a Brabender Plastograph, a single screw extruder, a twin screw extruder, etc.

Upon kneading, the temperature is chosen from the range of 150° to 400° C., preferably 200° to 350° C.

The addition of tertiary amines, quaternary ammonium salts, phosphines or imidazoles which are used as catalysts for promoting the reaction of the compatibilizing agent (C) is not particularly restricted.

The resin composition of the present invention may also contain other substances, if necessary and desired. Examples of such additives include elastomers, flame retardants, stabilizers, plastics, lubricants, etc.

Examples of the elastomers include polybutadiene rubber, polyisoprene rubber, butyl rubber, ethylene-propylene copolymer rubber, ethylene-propylene-non-conjugated diene copolymer rubber, butadiene-styrene copolymer rubber, butadiene-acrylonitrile copolymer rubber, hydrogenated and non-hydrogenated styrene-conjugated diene block copolymer rubber, polyester rubber, acryl rubber, silicone rubber, and modified products thereof.

Among them, preferred elstomers are ternary copolymers obtained by copolymerization of diene compounds, ethylene-propylene copolymer rubbers including modified copolymers such as graft copolymers obtained by graft copolymerization of unsaturated monomers such as styrene, ethylene-propylene non-conjugated diene copolymer rubbers, and styrene-conjugated diene block copolymer rubbers such as styrene-isoprene diblock copolymers including hydrogenated copolymers such as partially hydrogenated ones, styrene-butadiene triblock copolymers, etc.

Examples of the flame retardants include phosphoric acid esters exemplified by triphenyl phosphate, tricresyl phosphate, a phosphate obtained from a mixture of isopropyl phenol and phenol, phosphates obtained from difunctional phenols such as benzohydroquinone or bisphenol A with other alcohols or phenols, etc.; brominated compounds such as decabromobiphenyl, pentabromotoluene, decabromodiphenyl ether, hexabromobenzene, brominated polystyrene, brominated epoxy resin, etc.; nitrogen-containing compounds such as melamine, melamine triisocyanurate, etc.

Other additives are illustratively given below. Examples of the stabilizers are sterically hindered phenols, organic phosphites, diazide oxalates, sterically hindered amines, etc. Specific examples of the lubricants are polyethylene wax, paraffin, etc.

The ratio of these other additives to be formulated can freely be chosen depending upon purpose, but as a general guideline when using these additives, the elastomers are incorporated in an amount of 100 parts by weight or less; the flame retardants in an amount of 30 parts by weight or less, preferably 1 to 20 parts by weight; the stabilizers in an amount of 20 parts by weight or less, preferably 0.001 to 10 parts by weight; and the lubricants in an amount of 2 parts by weight or less, based on the total 100 parts by weight of the polyphenylene ether (A) and the polyarylene sulfide (B).

The resin composition of the present invention is used for various cases, frames, connectors, switches and other mechanical parts in the electric, electronic and OA fields; magnet fly wheels, door mirror stays, lamp reflectors, cylinder head covers, various gears in the field of automobiles and vehicles; various housings, pulleys, handles, etc. in the mechanical field.

Hereinafter the present invention will be described in more detail with reference to the examples but is not deemed to be limited thereto.

The temperature-mediated crystallization (Tmc) was measured on a sample cut out of a pressed film of the resin composition using a differential scanning calorimeter [manufactured by SEIKO DENSHI KOGYO K.K.: DSC220C], under the conditions of rapidly heating to 350° C., maintaining at the temperature for 5 minutes and then depressing at a rate of 10° C./min from the melted state.

Abbreviations used in the following Examples and Comparative Examples are as follows.

PPE: poly(2,6-dimethyl-1,4-phenylene ether) having a limiting viscosity of 0.46 dl/g when measured in chloroform at 30° C.

PPS-A: linear type polyphenylene sulfide having Tmc of 195° C. and a melt viscosity of 1000 poise (at a temperature of 316° C. and a shearing rate of 1000 sec$^{-1}$)

PPS-B: linear type polyphenylene sulfide having Tmc of 249° C. and a melt viscosity of 800 poise PPS-C: linear type polyphenylene sulfide having Tmc of 249° C. and a melt viscosity of 400 poise PPS-D: crosslinking type polyphenylene sulfide having Tmc of 234° C. and a melt viscosity of 200 poise MDI: 4,4'-diphenylmethane diisocyanate cMDI: polymethylene polyphenylene polyisocyanate [SUMIJURU 44V20, manufactured by Sumitomo Bayer Urethane K.K.]

The test piece provided for each test in the Examples was prepared by injection molding under the conditions of: 320° to 340° C. of a molding temperature and 140° C. of a mold temperature, using an injection molding machine. For molding a test piece used for determining welding strength, a mold designed to inject a resin from both edges of the test piece which resin meets at the center of the test piece was used. A thickness of each test piece used was 3.2 mm. A tensile property is data obtained by modification of the measurement method defined in ASTM D790 at 23° C.

EXAMPLE 1

A mixture of 20 parts by weight of PPE and 80 parts by weight of PPS-A was supplied at a barrel temperature of 320° C. through a feeding port at the upstream of a twin screw extruder of 50 mm diameter equipped with two feeding ports at the edge of the upstream side and at the center ITEM-50, manufactured by Toshiba Machine Co., Ltd.]. The extruded strand was pelletized to obtain the resin composition of the present invention.

The compositional proportion of the composition and the tensile strength and breaking extension of the welded and non-welded portions are shown in Tables 1 and 2.

In Table 2, numerical values within parentheses at the welded portion designate a rate to the non-welded portion (retention rate: %).

COMPARATIVE EXAMPLE 1

The same procedures were carried out as in Example 1 except that PPS-B was replaced for PPS-A. The resin composition for comparison was thus obtained.

The composition was tested in a manner similar to Example 1. The results are shown in Tables 1 and 2.

EXAMPLE 2

A mixture of 35 parts by weight of PPE, 65 parts by weight of PPS-A and 3 parts by weight of cMDI was extruded at a barrel temperature of 300° C. using a single screw extruder of 40 nun diameter. The extruded strand was pelletized to obtain the resin composition of the present invention.

The composition was tested in a manner similar to Example 1. The results are shown in Tables 1 and 2.

EXAMPLE 3 and COMPARATIVE EXAMPLES 2 AND 3

The same procedures were carried out as in Example 2 except that the polyphenylene ether, polyarylene sulfide and compatibilizing agent and the proportion thereof were changed as shown in Table 1.

The composition was tested in a manner similar to Example 1. The results are shown in Tables 1 and 2.

EXAMPLE 4

While continuously supplying 30 parts by weight of PPE, 70 parts by weight of PPS-A and 3 parts by weight of MDI through the feeding port at the upstream of the twin screw extruder used in Example 1 and 66.7 parts by weight of glass fibers (GF) of 3 nun length through the feeding port at the center, extrusion was made at a barrel temperature of 320° C., with maintaining the proportion. The extruded strand was pelletized to obtain the resin composition of the present invention.

The composition was tested in a manner similar to Example 1. The results are shown in Tables 1 to 2.

COMPARATIVE EXAMPLE 4

The same procedures were carried out as in Example 1 except that PPS-C was replaced for PPS-A. The resin composition for comparison was thus obtained.

The composition was tested in a manner similar to Example 1. The results are shown in Tables 1 and 2.

TABLE 1

| | Formulation | | | | | | | |
|---|---|---|---|---|---|---|---|---|
| | PPE | | PPS | | MDI or cMDI | | filler | |
| No. | Kind | part by wt | kind | part by wt | kind | part by wt | kind | part by wt |
| Example 1 | PPE | 20 | PPS-A | 80 | — | — | — | — |
| Comparative Example 1 | PPE | 20 | PPS-B | 80 | — | — | — | — |
| Example 2 | PPE | 35 | PPS-A | 65 | cMDI | 3 | — | — |
| Comparative Example 2 | PPE | 35 | PPS-C | 65 | cMDI | 3 | — | — |
| Example 3 | PPE | 40 | PPS-A | 60 | cMDI | 3 | — | — |
| Comparative Example 3 | PPE | 40 | PPS-D | 60 | cMDI | 3 | — | — |
| Example 4 | PPE | 30 | PPS-A | 70 | MDI | 3 | GF | 67 |
| Comparative Example 4 | PPE | 30 | PPS-C | 70 | MDI | 3 | GF | 67 |

| | Non-Welded Portion | | Welded Portion | |
|---|---|---|---|---|
| | Tensile Strength kg/cm$^2$ | Breaking Extension % | Tensile Strength kg/cm$^2$ (retension rate: %) | Breaking Extension % (retension rate: %) |
| Example 1 | 490 | 2.2 | 460 (94) | 2.0 (91) |
| Comparative Example 1 | 560 | 2.5 | 430 (77) | 1.8 (72) |
| Example 2 | 790 | 4.1 | 780 (99) | 4.1 (100) |
| Comparative Example 2 | 400 | 4.4 | 320 (80) | 2.1 (48) |
| Example 3 | 700 | 3.3 | 670 (96) | 3.3 (100) |
| Comparative Example 3 | 500 | 2.2 | 440 (88) | 1.8 (82) |
| Example 4 | 1640 | 3.1 | 550 (34) | 1.2 (39) |
| Comparative Example 4 | 1630 | 3.5 | 460 (28) | 1.0 (29) |

The thus obtained resin composition of the present invention provides excellent impact strength and economical properties and can therefore be molded by various molding techniques such as extrusion molding, injection molding, blow molding, etc. The molded articles prepared from the resin composition of the present invention are provided to the market as a variety of resin articles. Accordingly, the present invention is of great value from an industrial viewpoint.

What is claimed is:

1. A resin composition comprising (A) a polyphenylene ether and (B) a polyarylene sulfide having a temperature-mediated crystallization of not greater than 225° C. and a melting viscosity of 500 to 2000 poise under the condition of a temperature at 316° C. and a shear rate of 1000 sec$^{-1}$.

2. A resin composition according to claim 1, which further contains (C) a compatibilizing agent.

3. A resin composition according to claim 1, wherein said polyphenylene ether (A) is poly(2,6-dimethyl-1,4-phenylene ether).

4. A resin composition according to claim 1, wherein said polyarylene sulfide (B) is polyphenylene sulfide.

5. A resin composition according to claim 2, wherein said compatibilizing agent is a polyisocyanate.

6. A resin composition according to claim 5, wherein said polyisocyanate is selected from the group consisting of 2,4-toluylene diisocyanate, 2,6-toluylene diisocyanate, 4,4'-diphenylmethane diisocyanate, 3,3'-dimethylbiphenyl -4,4'-diisocyanate, diphenyl ether-4,4'-diisocyanate, hexamethylene diisocyanate, isophorone diisocyanate and polymethylene polyphenylene polyisocyanate.

7. A resin composition according to claim 5, wherein said polyisocyanate is polymethylene polyphenylene polyisocyanate.

8. A resin composition according to claim 1, which further contains a filler (D).

9. A resin composition according to claim 8, wherein said filler (D) is glass fibers.

* * * * *